United States Patent
Nakajima et al.

[11] Patent Number: 6,143,436
[45] Date of Patent: *Nov. 7, 2000

[54] MAGNETIC RECORDING MEDIUM AND INFORMATION RECORDING-REPRODUCTION METHOD USING THE SAME

[75] Inventors: Junsaku Nakajima, Yamatotakada; Akira Takahashi; Junji Hirokane, both of Nara; Yoshiteru Murakami, Hishinomiya; Kenji Ohta, Nara-ken, all of Japan

[73] Assignee: Sharp Kabushiki Kaisha, Osaka, Japan

[ * ] Notice: This patent is subject to a terminal disclaimer.

[21] Appl. No.: 08/909,194

[22] Filed: Aug. 11, 1997

Related U.S. Application Data

[62] Division of application No. 08/088,608, Jul. 7, 1993, Pat. No. 5,656,385, which is a continuation of application No. 07/742,318, Aug. 8, 1991, abandoned.

[30] Foreign Application Priority Data

Aug. 11, 1990 [JP] Japan .................... 2-212166
Oct. 31, 1990 [JP] Japan .................... 2-296308

[51] Int. Cl.$^7$ ...................................... G11B 5/66
[52] U.S. Cl. ............................ 428/694 ML; 428/694 SC; 428/694 MM; 428/694 EC; 428/900; 368/13; 360/110; 360/114
[58] Field of Search .................. 428/694 ML, 694 MM, 428/64.3, 900, 694 SC, 694 EC; 369/13; 360/110, 114

[56] References Cited

U.S. PATENT DOCUMENTS

| | | | |
|---|---|---|---|
| 4,923,765 | 5/1990 | Takayama et al. | 428/694 ML |
| 4,926,402 | 5/1990 | Masakawa | 369/13 |
| 5,055,353 | 10/1991 | Yamamoto et al. | 428/336 |
| 5,475,658 | 12/1995 | Takahashi et al. | 369/13 |
| 5,656,385 | 8/1997 | Nakajima | 428/694 T |

FOREIGN PATENT DOCUMENTS

| | | |
|---|---|---|
| 0349271 | 1/1990 | European Pat. Off. . |
| 3335689 | 4/1984 | Germany . |
| 3536210 | 4/1986 | Germany . |
| 1017237 | 1/1989 | Japan . |
| 2273351 | 11/1990 | Japan . |
| WO 92/02931 | 2/1992 | WIPO . |

OTHER PUBLICATIONS

European Search Report, mailed Jan. 1992 for corresponding application.

Nomura, et al., "Proposed Magneto–Optic Video Recording Systems Using Thermoremanet Techniques" 1979, pp. 21–28 and abstract thereof.

Primary Examiner—Leszek Kiliman
Attorney, Agent, or Firm—Dike, Bronstein, Roberts & Cushman, LLP; David G. Conlin; William J. Daley, Jr.

[57] ABSTRACT

A magnetic recording medium having a recording layer made up of a ferrimagnetic material whose compensation temperature is included within room temperatures and an information recording-reproduction method using the magnetic recording medium. During recording, while a light beam is projected on the recording layer so as to raise the temperature of a recording portion, information is recorded by applying a signal magnetic field from a magnetic head. During reproduction, while a light beam is projected on a reproducing portion of the recording layer so as to raise the temperature thereof, information is reproduced by detecting leakage flux from the reproducing portion by the magnetic head. Thus, during reproduction, no magnetic flux is generated from other portions of the recording layer not irradiated by the light beam. With the arrangement, crosstalk due to leakage flux from adjoining tracks not irradiated by the optical beam can be eliminated. Therefore, track pitches can be made narrower so as to increase recording density of the magnetic recording medium. Further, since crosstalk from adjoining tracks is eliminated, a high S/N can be achieved.

18 Claims, 8 Drawing Sheets

MAGNETIC RECORDING MEDIUM AND INFORMATION RECORDING-REPRODUCTION METHOD USING THE SAME

This application is a divisional of U.S. application Ser. No. 08/088,608, filed Jul. 7, 1993, now U.S. Pat. No. 5,656,385 which is a continuation of U.S. application Ser. No. 07/742,318 filed Aug. 8 1991, now abandoned.

FIELD OF THE INVENTION

The present invention relates to a magnetic recording medium for use in information recording or reproduction, and to an information recording-reproduction method using the magnetic recording medium.

BACKGROUND OF THE INVENTION

Recently, information recording-reproduction apparatuses utilizing optical techniques have been widely studied and developed. For example, in magneto-optical recording-reproduction apparatuses, thermomagnetic recording making use of the phenomenon that magnetic characteristics of a magneto-optical recording medium vary with temperatures is adopted for writing information, while the Faraday effect and the magnetic Kerr effect are utilized for reproducing information.

On the other hand, in a technical research report of Electronic Information Communication Institute, Magnetic Recording Seminar (MR) 79-3, P. 21(1979), there is described an information recording-reproduction apparatus wherein analog signals are recorded on a magnetic tape through thermomagnetic recording, and reproduced by a magnetic head. Chromium dioxide is used as a material for the magnetic layer of the magnetic tape. During recording, while converging a light beam with a predetermined intensity on the magnetic layer of the travelling magnetic tape to cause a required temperature change on an extremely limited area on the magnetic layer, a residual magnetization is formed on the magnetic layer in response to a magnetic field applied from a recording-use magnetic head by supplying the recording-use magnetic head with a driving current varying with analog signals. The information thus recorded is reproduced by a reproduction-use magnetic head.

In the above arrangement, as long as the condition that a width of the reproduction-use magnetic head is smaller than the pitch of recording tracks on the magnetic tape is satisfied, a high S/N can be achieved during reproduction, since crosstalk from adjoining tracks can be minimized.

However, if the density of the recording tracks is increased in order to increase the recording capacity, the pitch of the recording tracks should be made narrower, thereby arising a problem that it is difficult to manufacture reproduction-use magnetic heads satisfying the above condition.

SUMMARY OF THE INVENTION

It is an object of the present invention to provide a magnetic recording medium for permitting high density information recording and reproduction as well as an information recording-reproduction method employing the magnetic recording medium.

In order to achieve the above object, a magnetic recording medium of the present invention is characterized in that a ferrimagnetic material whose compensation temperature is within substantial room temperatures, is employed to form a recording layer.

With the above arrangement, during a reproduction process, portions of the recording layer not irradiated by the light beam do not have magnetic flux. Thus, since crosstalk due to leakage flux from adjacent tracks not irradiated by the light beam is eliminated, the pitch of the tracks can be made narrower, thereby increasing recording density of the magnetic recording medium. Further, since crosstalk from adjacent tracks is eliminated, a high S/N can be achieved.

An information recording-reproduction method of the present invention wherein the above magnetic recording medium is employed, is characterized by the following arrangement. During recording, while a light beam is projected onto the recording layer so as to raise the temperature of a recording portion, information is recorded thereon by applying a signal magnetic field from the magnetic head. During reproduction, while a light beam is projected onto a reproducing portion of the recording layer so as to raise the temperature thereof, information is reproduced by detecting magnetic flux leaking therefrom by the magnetic head.

With the above arrangement, during reproduction, the light beam is projected onto a reproducing portion until it causes a temperature rise whereby the saturated magnetization substantially becomes maximum. Since the saturated magnetization is zero in other portions that are not irradiated by the light beam and kept at room temperature, the magnetic head can detect with high precision magnetic flux generated only from the saturated magnetization at the portion having the temperature rise, thereby making it possible to avoid adverse effects from crosstalk.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic sectional view showing an arrangement of a magnetic recording medium of the present invention.

FIG. 2 is an explanatory drawing showing temperature dependence of coercive force of a ferrimagnetic material.

FIG. 3 is an explanatory drawing showing temperature dependence of saturated magnetization of the ferrimagnetic material.

FIG. 4 is an explanatory drawing showing X-dependence of coercive force Hc at room temperature of DyX $(Fe_{0.82}CO_{0.18})_{1-X}$.

FIG. 5 is an explanatory drawing showing Y-dependence of the Curie temperature of $Dy_X(Fe_{1-y}Coy)_{1-X}$ used in a recording layer of the magnetic recording medium of the present invention.

FIG. 6 is an explanatory drawing showing Y-dependence of saturated magnetization of $Dy_X(Fe_{1-y}Coy)_{1-X}$ used in a recording layer of the magnetic recording medium of the present invention.

FIG. 7 is an explanatory drawing showing temperature dependence o f coercive force Hc of $Dy_{0.24}$ $(Fe_{0.60}CO_{0.40})_{0.76}$.

FIG. 8 is a schematic drawing showing an information recording-reproduction apparatus for recording or reproducing information by the use of the magnetic recording medium of the present invention.

FIG. 9 is a flow chart showing a recording method of the present invention.

FIG. 10 is a flow chart showing a reproducing method of the present invention.

DESCRIPTION OF THE EMBODIMENTS

Referring to FIGS. 1 through 10, the following description will discuss one embodiment of the present invention.

Figure 1:
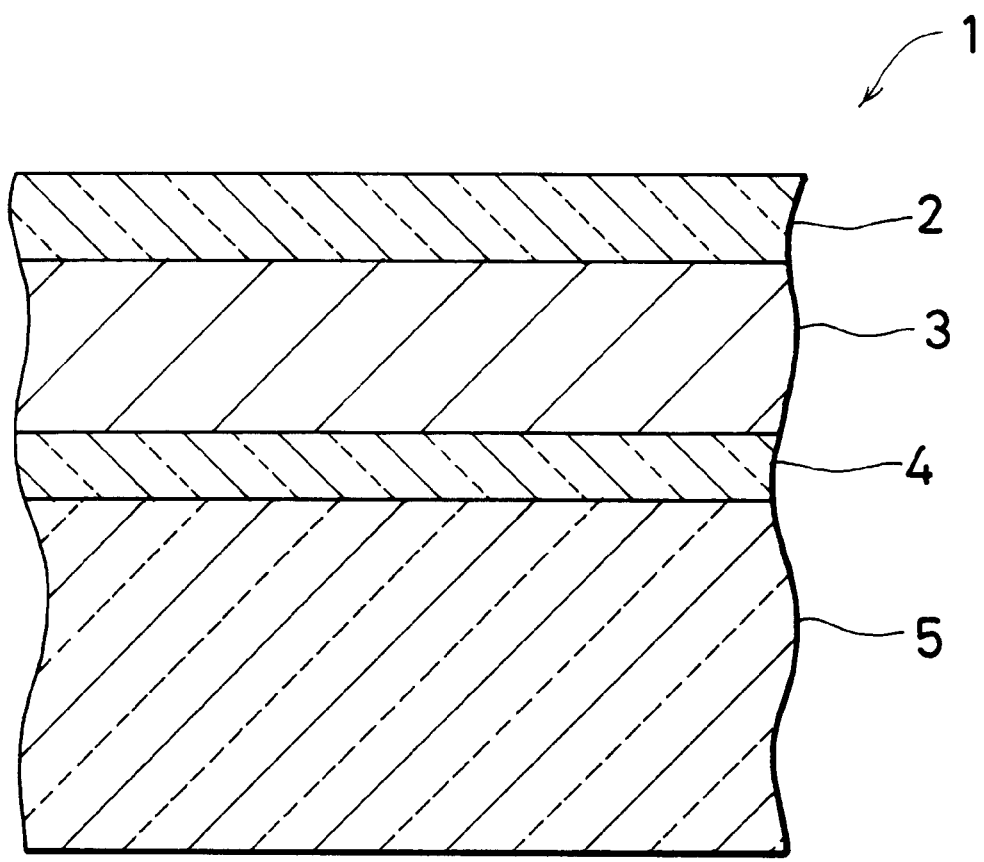
FIGS. 1 through 10 show one embodiment of the present invention.

As illustrated in FIG. 1, a magnetic recording medium 1 of the present invention has a transparent substrate 5 (base) and an AlN film 4 (aluminum nitride film, for example, 80 nm in thickness) as a transparent dielectric thin film (reflection prevention film) formed on the transparent substrate 5. The AlN film 4 is adapted to increase temperature rise efficiency by preventing reflection of light. A recording layer 3 made up of a ferrimagnetic material is formed on the surface of the AlN film 4, and one example of such ferrimagnetic material as the recording layer 3 is $Dy_X(Fe_{1-y}Coy)_{1-X}$, an amorphous rare earth-transition metal alloy (for example, the recording layer has a thickness of 100 nm). An AlN film 2 (for example, 20 nm in thickness) as a transparent dielectric thin film (protection film) is formed on the surface of the recording layer 3. The AlN film 2 is disposed for protecting the recording layer 3.

Figure 2:
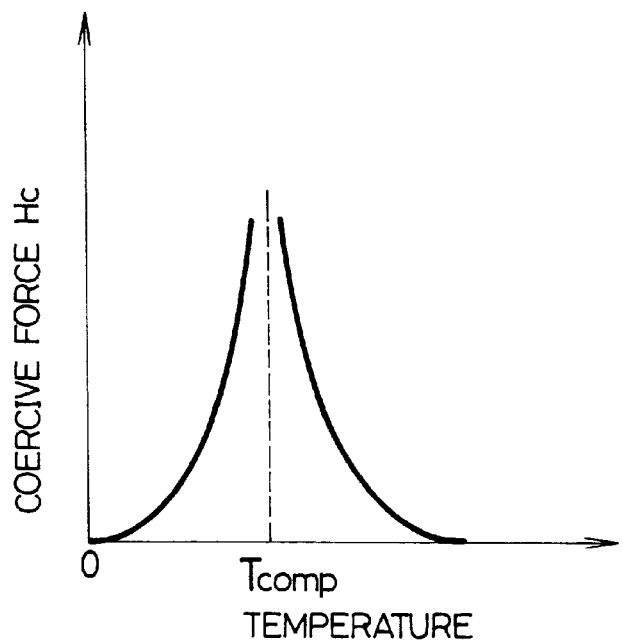
Figure 3:
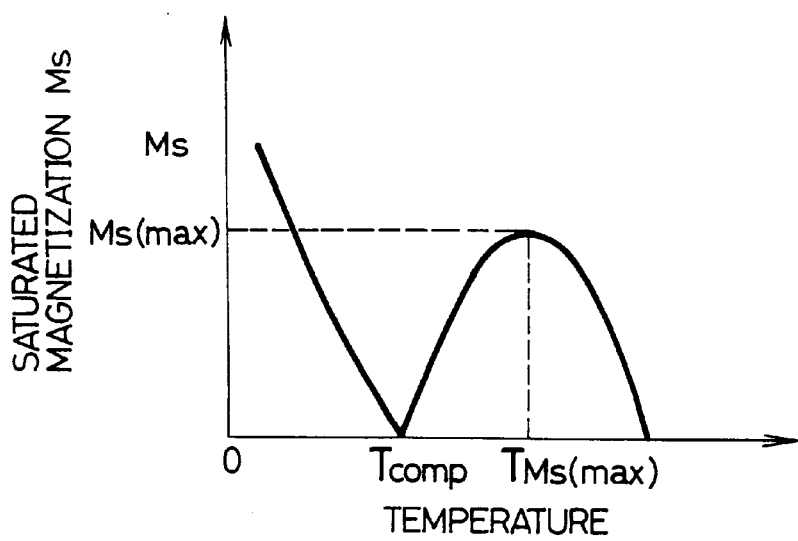

Here, the ferrimagnetic material adopted as the recording layer 3 generally has the Curie temperature Tc and the compensation temperature $T_{comp}$. FIG. 2 and FIG. 3 respectively show temperature dependences of coercive force Hc and saturated magnetization Ms with respect to the ferrimagnetic material. At the compensation temperature T*comp*, the coercive force Hc diverges while the saturated magnetization Ms becomes substantial zero.

The present embodiment adopts $Dy_X(Fe_{1-y}Coy)_{1-X}$ as one example of the ferrimagnetic material. As X and Y of $Dy_X(Fe_{1-y}Coy)_{1-X}$ are varied, the compensation temperature $T_{comp}$ and the Curie temperature Tc vary in accordance with the variations. In the magnetic recording medium 1 of the present invention, the recording layer 3 is adapted to have its compensation temperature $T_{comp}$ set to be within room temperatures by varying X and Y.

More specifically, if the recording layer 3 whose compensation temperature $T_{comp}$ is set to be within room temperatures is employed, a recorded portion which has been made by applying a signal magnetic field will not generate any leakage flux as long as the portion is kept at room temperature. However, when the temperature of the portion is raised by projecting a light beam or the like, the saturated magnetization Ms becomes greater as is shown in FIG. 3 to mark a maximum value Ms(max) at a temperature $T_{Ms}$(max). Therefore, by setting a temperature T of the portion to be irradiated by the light beam within a range, $T_{comp} < T < Tc$, it can be set that the saturated magnetization Ms is equal to the maximum value Ms(max). With the arrangement, information is reproduced with high precision by detecting magnetic flux leaking from the recorded magnetization.

The following description will discuss a case where $Dy_X(Fe_{1-y}Coy)_{1-X}$ is employed as the recording layer 3 of the magnetic recording medium 1.

Figure 4:
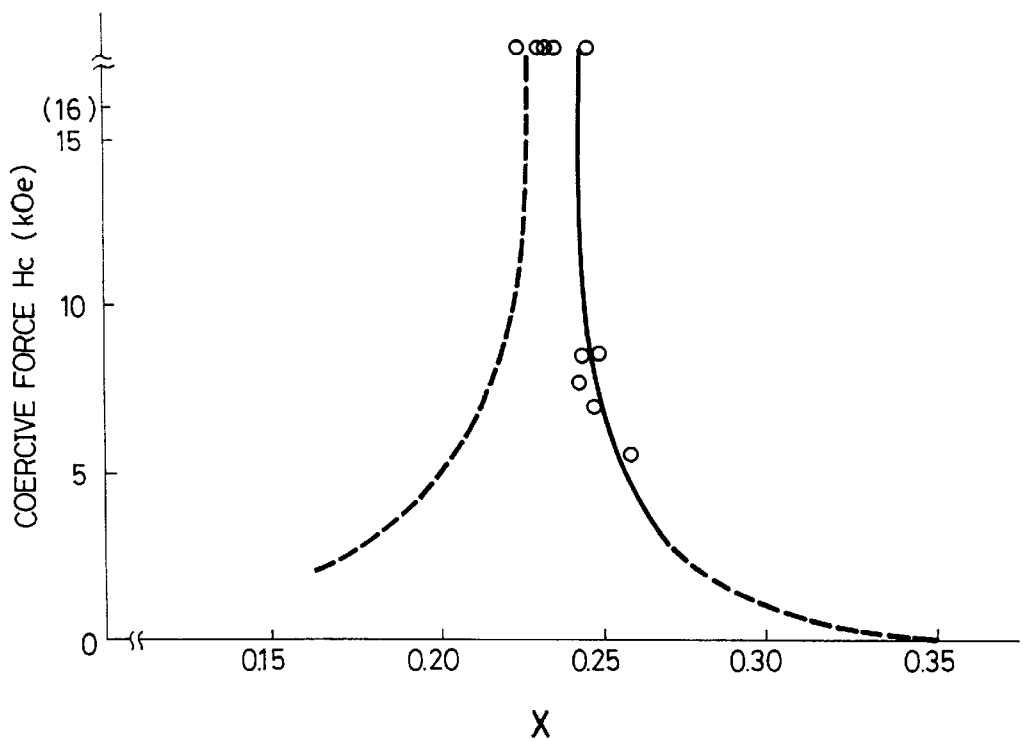
Figure 5:
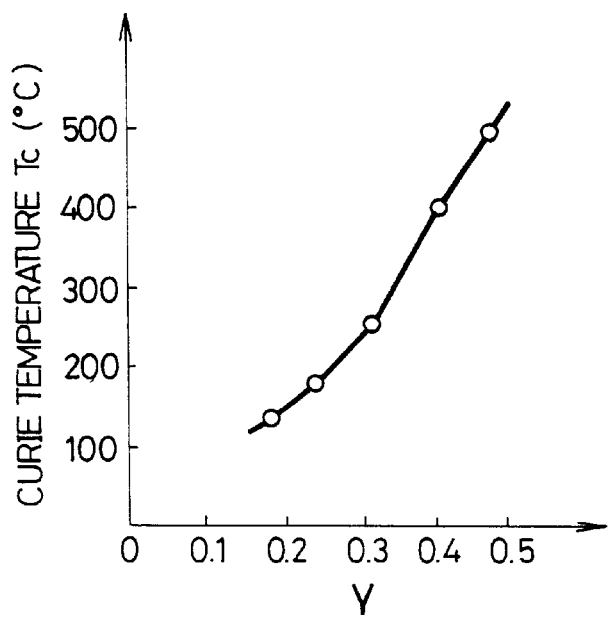
Figure 6:
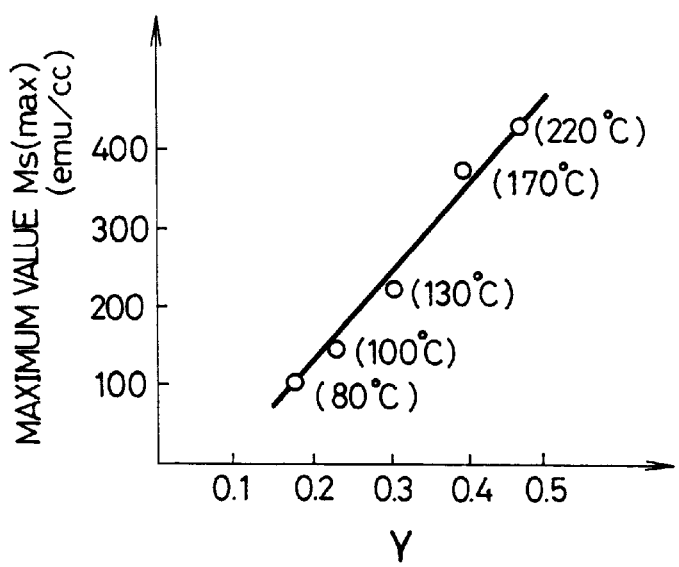

As shown in FIG. 4, in $Dy_X(Fe_{0.82}CO_{0.18})_{1-X}$, when the coercive force Hc is plotted with respect to X at room temperature, it is noted that the coercive force Hc becomes greater than 15 kOe within X indicated by $0.22 \leq X \leq 0.25$, while the compensation temperature $T_{comp}$ is kept within room temperatures. Accordingly, in $Dy_X(Fe_{1-y}Coy)_{1-X}$, by setting X within $0.22 \leq X \leq 0.25$, the compensation temperature $T_{comp}$ is allowed to be kept within room temperatures. When X is given by $0.22 \leq X \leq 0.25$, the Curie temperature Tc and the maximum value Ms(max) of the saturated magnetization Ms are allowed to have respective characteristics shown by FIG. 5 and FIG. 6 by varying Y as a variable. In addition, in each parenthesis of FIG. 6, there is given a temperature $T_{Ms}$(max) at which the saturated magnetization Ms shows a maximum value Ms(max).

In the meantime, the semiconductor laser for generating a light beam to be used for raising the temperature of a portion to be reproduced can not be extremely increased in its power (not more than 10mW). Therefore, it is necessary to select a composition wherein the temperature $T_{Ms\ (max)}$ at which the saturated magnetization Ms marks a maximum value Ms(max) ranges near 200° C. (160° C. to 240° C.). To satisfy this requirement, Y of $Dy_X(Fe_{1-y}Coy)_{1-X}$ should be given by $0.35 \leq Y \leq 0.50$ (at this time, X is given by $0.22 \leq X \leq 0.25$). Here, 350 emu/cc $\leq$ Ms(max) $\leq$ 500 emu/cc holds (see FIG. 6). Meanwhile, for ferrimagnetic materials, at least 400 emu/cc is necessary for the value of the saturated magnetization Ms at a portion to be reproduced, in order to obtain enough reproducing output. Consequently, the range of Ms(max) is determined by the two requirements, that is, to obtain enough reproducing output and the upper limit of the semiconductor laser power. In the case of using $Dy_X(Fe_{1-y}Coy)_{1-X}$, an inequality, 400 emu/cc $\leq$ Ms(max) $\leq$ 500 emu/cc should be satisfied. For this reason, X=0.24 and Y=0.40 are desirably obtained.

Figure 7:
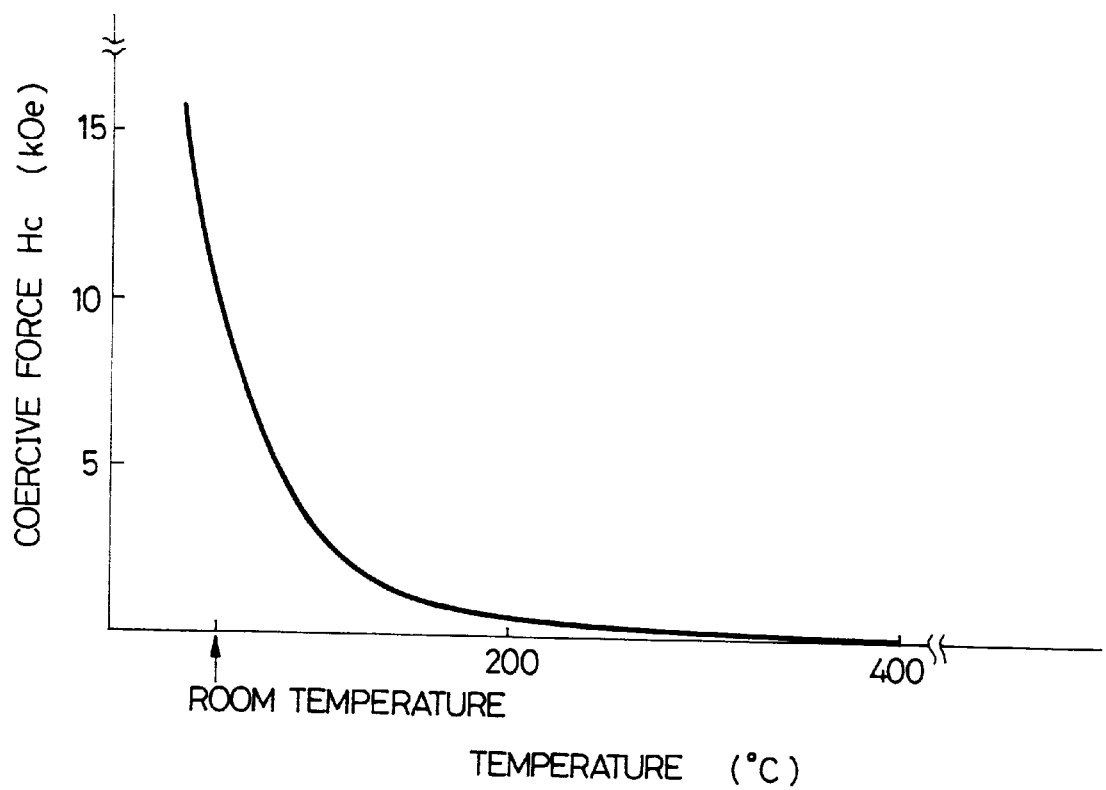

FIG. 7 shows temperature dependence of the coercive force Hc of $Dy_{0.24}(Fe_{0.60}CO_{0.40})_{0.76}$ having the desirable X and Y. Here, when Y=40, the temperature $T_{MS}$(max) at which the saturated magnetization Ms marks a maximum value Ms(max) is 170° C., and the maximum value Ms(max) substantially reads 400 emu/cc (see FIG. 6). Accordingly, in recording, the irradiated portion is raised in its temperature to 170° C., while the coercive force Hc substantially shows 1 kOe (see FIG. 7). On the other hand, in reproduction, the irradiated portion is also raised to 170° C., while the saturated magnetization Ms at this time is 400 emu/cc (see FIG. 6), thereby making it possible to obtain enough reproducing output.

Additionally, for example, magnetic tapes, magnetic disks, magnetic cards, or other media may be employed as the magnetic recording medium 1. Further, although the explanation is given on $Dy_X(Fe_{1-y}Coy)_{1-X}$ as an example material of the recording layer 3, it is not necessarily limited to the particular material and any ferrimagnetic material may be used as long as it has the compensation temperature $T_{comp}$ ranging within room temperatures.

Figure 8:
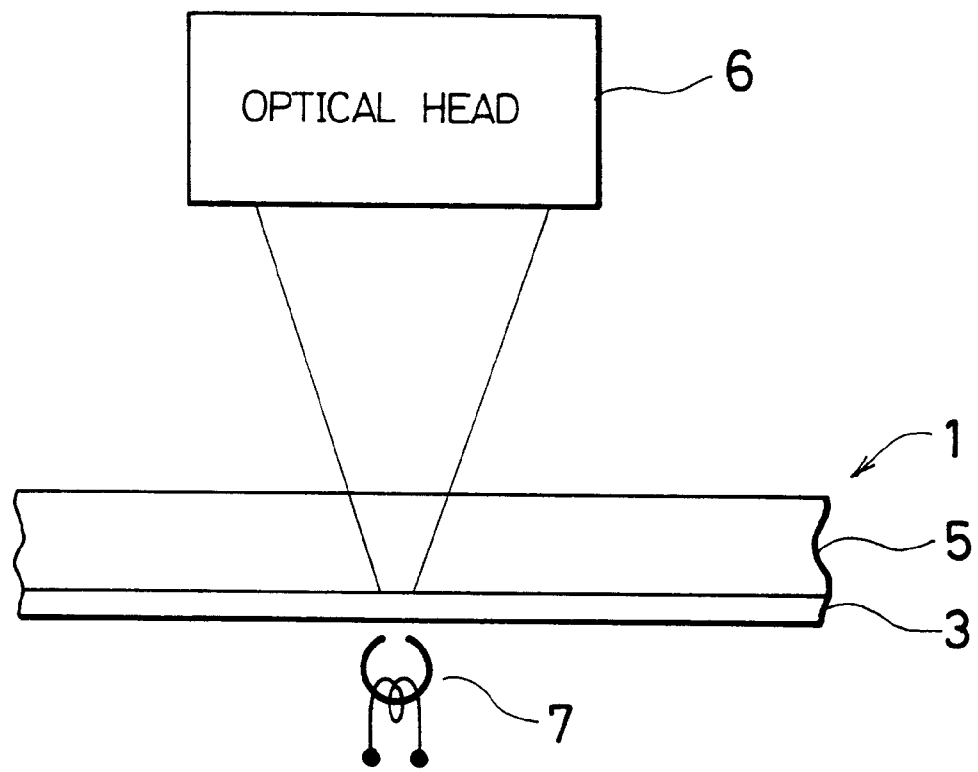
Figure 9:
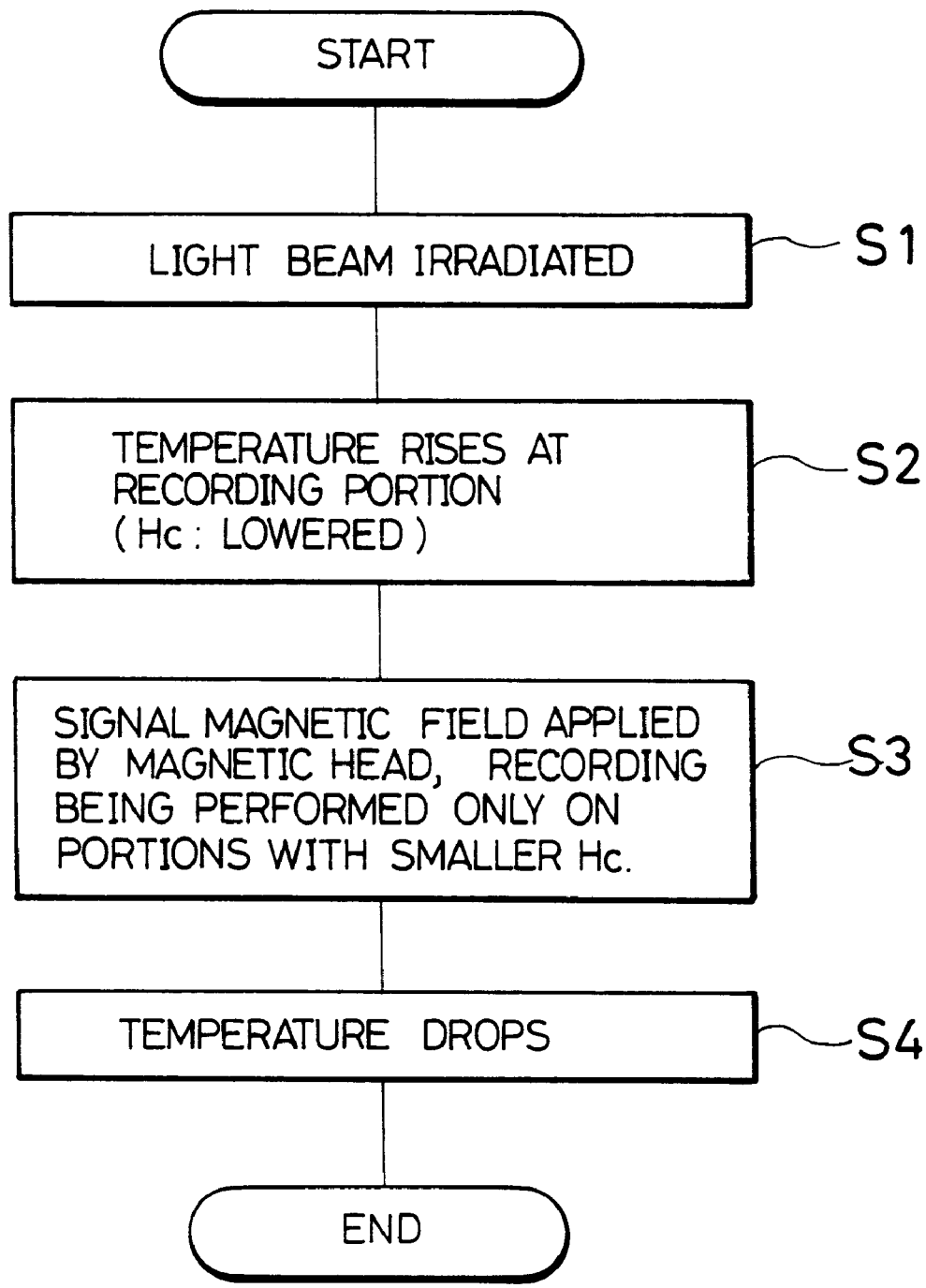
Figure 10:
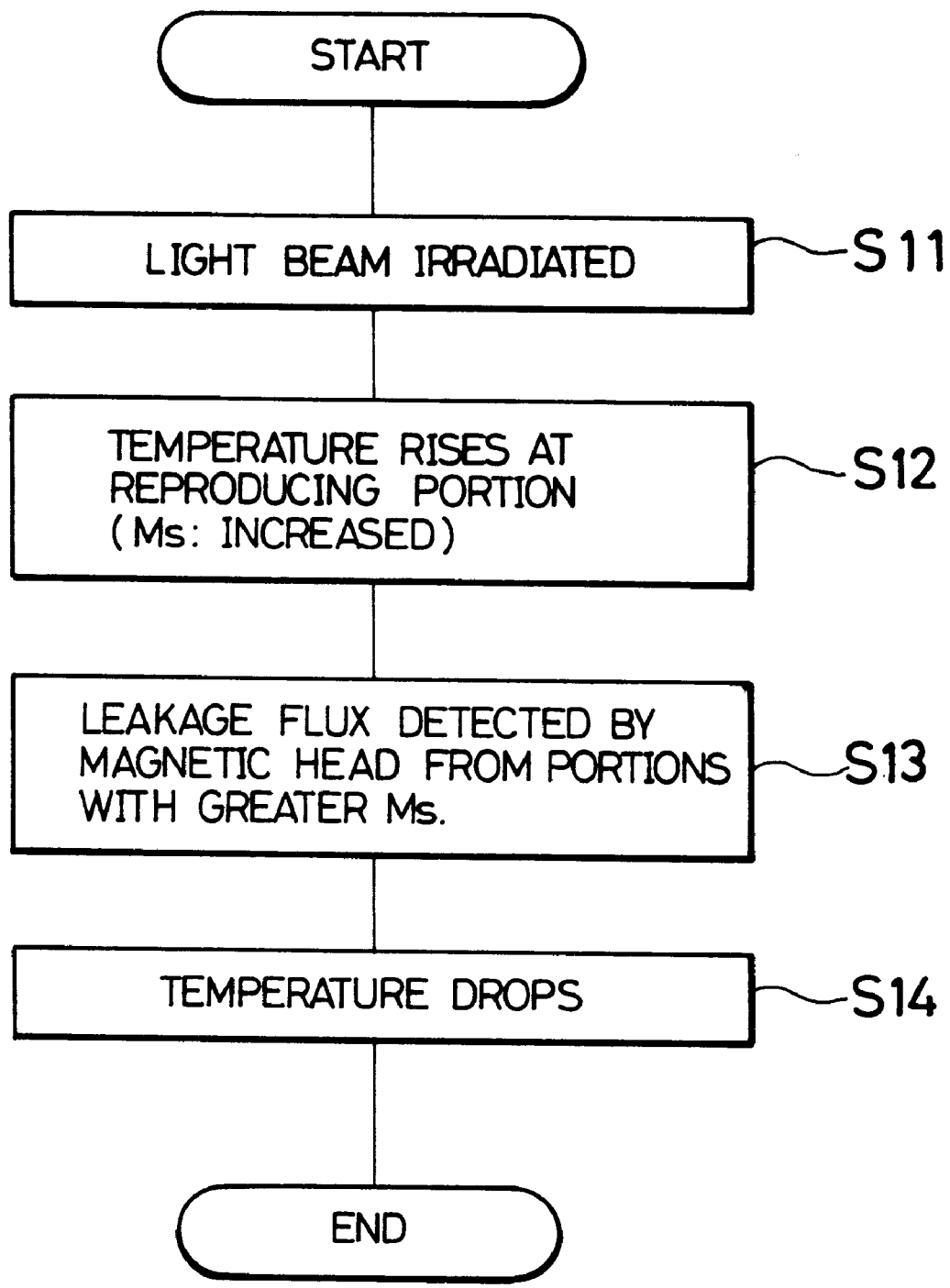

Referring to FIG. 8 through FIG. 10, the following description will discuss a method for recording information on the above-mentioned magnetic recording medium 1 and reproducing the recorded information therefrom.

Recording and reproduction of information are performed by an information recording-reproduction apparatus, for example, shown in FIG. 8. The optical head 6 is disposed at the side of the transparent substrate 5 of the magnetic recording medium 1, while the magnetic head 7 is disposed at the side of the recording layer 3 of the magnetic recording medium 1 so as to face a converging point of a light beam projected from the optical head 6.

Next, according to a flow chart of FIG. 9, an explanation is given of the recording method.

As shown in FIG. 9, a light beam projected from the optical head 6 is converged on a desired recording portion on the recording layer 3 of the magnetic recording medium 1 (S1). The temperature of the recording portion irradiated by the light beam is raised to a degree at which the coercive force Hc of the recording portion becomes small enough (as small as 1 kOe)(S2). Then, a signal magnetic field having modulated in response to information to be recorded is applied by the magnetic head 7, and thereby recordings are made on the recording portion. At this time, the recordings are made only on the recording portion where the coercive force Hc is lowered to be substantial 1 kOe (S3). Next, the irradiation by the light beam is stopped, the temperature of the recording portion drops (S4), and the recording operation is completed.

Next, according to a flow chart of FIG. 10, an explanation is given of a reproducing method of information recorded on the magnetic recording medium 1 through the above method.

First, a light beam is projected from the optical head 6 onto a reproducing portion on the recording layer 3 (S11). The temperature of the reproducing portion irradiated by the light beam is raised, and the saturated magnetization Ms of the reproducing portion is also raised (S12). At this time, the temperature is preferably raised to the vicinity of a temperature $T_{MS}(max)$ at which the saturated magnetization Ms reaches a maximum value Ms(max). Additionally, at this time, the saturated magnetization Ms of other portions not irradiated by the light beam remains substantial zero. This is because those portions not irradiated by the light beam are kept at room temperature.

Then, leakage flux from the reproducing portion having the greater saturated magnetization Ms is detected by the magnetic head 7 (S13). Next, the irradiation applied on the reproducing portion by the light beam is stopped, the temperature of the reproducing portion drops (S14), and the reproducing operation is completed.

Additionally, various conditions of recording and reproduction with respect to the magnetic recording medium 1 are shown, for example, as follows.

The semiconductor laser for emitting a light beam has a wave length of 780 nm and a laser power of 8 mW in recording as well as in reproduction, and further an NA(Numerical Aperture) of the objective lens in the optical head 6 is 0.45. Further, the magnetic head 7 has a gap length of 0.7 µm, and the width of the magnetic head 7(a width in the direction orthogonal to the track direction) is 30 µm. The travelling speed of the magnetic recording medium 1 is 8 m/sec and the track pitch thereof is 2 µm.

After performing a recording operation under these conditions, a resulting reproducing operation offered an output having sufficient signal quality even in a case of 100 kBPI (Bit Per Inch) in linear recording density, and crosstalk reduced to a sufficient level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information reproduction apparatus comprising:
    a magnetic recording medium consisting essentially of a base and a recording layer composed of a ferrimagnetic material formed on the base, the ferrimagnetic material having a saturated magnetization that is set to have a maximum value at a temperature in a range of 160° C. to 240° C.
    an optical head for projecting a light beam onto a desired portion on the recording layer so the desired portion is heated to a vicinity of the temperature of the maximum value; and
    a magnetic head for reproducing information by detecting magnetic flux that is leaked from the desired portion.

2. An information reproducing apparatus comprising:
    a magnetic recording medium consisting essentially of a base and a recording layer composed of a ferrimagnetic material formed on the base, the ferrimagnetic material having a saturated magnetization that is set to have a maximum value at a temperature in a range of 160° C. to 240° C.;
    irradiating means for irradiating light onto a portion of said magnetic medium so the irradiated portion is heated to a vicinity of the temperature of the maximum value, thereby creating a temperature-rise portion in said magnetic medium; and
    detecting means for detecting magnetic flux leaked from said temperature-rise portion.

3. The apparatus of claim 2 wherein said irradiating means is an optical head and said detecting means is a magnetic head.

4. The apparatus of claim 2 wherein the base has a light-transmitting property and the ferromagnetic material has a compensation temperature that is substantially equal to room temperature.

5. An information reproducing apparatus comprising:
    a magnetic recording medium having a recording layer having a composition of $Dy_X(Fe_{1-y}Co_y)_{1-X}$,
    wherein a range X is given by:
        $0.22 \leq X \leq 0.25$
    and a range Y is given by:
        $0.35 \leq Y \leq 0.50$;
    an optical head located adjacent to one side of said recording medium and situated to irradiate light onto said recording medium; and
    a magnetic head located on another side of said recording medium and situated to detect leakage flux from said recording medium.

6. The apparatus of claim 5 wherein said magnetic recording medium consists essentially of:
    a base having a light transmission property, and
    a recording layer composed of a ferrimagnetic material formed on the base, the ferrimagnetic material having a compensation temperature that is substantially equal to room temperature.

7. The information reproduction apparatus of claim 1 wherein the ferromagnetic material has a composition of $Dy_X(Fe_{\lambda-y}Co_y)_{\lambda-y}$ where a range for X is given by: $0.22 \leq x < 0.25$ and a range for Y is given by: $0.35 \leq y < 0.50$.

8. The information reproduction apparatus of claim 1 wherein the base has a light-transmitting property and the ferromagnetic material has a compensation temperature that is virtually equal to room temperature.

9. The information reproduction apparatus of claim 1 wherein the ferromagnetic material has a saturated magnetization that is set to have a maximum value in a vicinity of 200° C.

10. An information recording-reproduction method for recording or reproducing information by using a magnetic recording medium consisting essentially of a base and a recording layer composed of a ferrimagnetic material formed on the base, the ferrimagnetic material having a compensation temperature that is substantially equal to room temperature, comprising the steps of:
    in recording, while raising the temperature of a recording portion by projecting a light beam on the recording layer, thereby making the coercive force of the recording portion smaller, recording information by applying from the magnetic head onto the recording portion a magnetic field being reversed in response to information; and in reproduction, while raising the temperature of a reproducing portion by projecting a light beam on the recording layer, thereby making the magnetization of the reproducing portion greater, reproducing information by detecting leakage flux from the reproducing portion by the magnetic head.

11. An information reproduction method for reproducing information from a magnetic recording medium consisting essentially of a base having a light transmission property and a recording layer composed of a ferrimagnetic material formed on the base, the ferrimagnetic material having a compensation temperature that is virtually equal to room temperature with its saturated magnetization being set to have a maximum value at a temperature in a range of 160° C. to 240° C., the information reproduction method comprising the steps of:

creating a temperature-rise portion in said recording medium by heating a reproducing portion of said recording medium to a vicinity of the temperature at which its saturated magnetization has a maximum value by projecting a light beam onto said recording medium; and detecting leakage magnetic flux from the temperature-rise portion by the use of a magnetic head.

12. An information re producing method for reproducing information from a magnetic recording medium consisting essentially of a base and a recording layer composed of a ferrimagnetic material formed on the base, the ferrimagnetic material having a saturated magnetization that is set to have a maximum value at a temperature in a range of 160° C. to 240° C., the information reproducing method comprising steps of:

irradiating light onto a portion of said magnetic medium so the irradiated portion is heated to a vicinity of the temperature of a maximum value, thereby creating a temperature-rise portion in said magnetic medium; and detecting magnetic flux leaked from said temperature-rise portion.

13. The method of claim 12, wherein the base has a light-transmitting property and the ferromagnetic material has a compensation temperature that is substantially equal to room temperature.

14. The method of claim 12 wherein said method uses both an optical head and a magnetic head, the optical head used during the irradiating step and the magnetic head used during the detecting step.

15. The information recording-reproduction method of claim 10 wherein the ferrimagnetic material has a saturated magnetization that is set to have a maximum value at a temperature in a range of 160° C. to 240°.

16. The information recording-reproduction method of claim 12 wherein the ferromagnetic material has a saturated magnetization that is set to have a maximum value in a vicinity of 200° C.

17. The information recording-reproduction method of claim 10 wherein upon reproducing, the reproducing portion is heated to a vicinity of a temperature at which the saturated magnetization has a maximum value.

18. The information reproduction method of claim 11 wherein the ferrimagnetic material has a saturated magnetization that is set to have a maximum value in a vicinity of 200° C.

* * * * *